United States Patent
Capone et al.

(10) Patent No.: US 12,505,071 B2
(45) Date of Patent: Dec. 23, 2025

(54) TECHNIQUES FOR DETECTING FILE SIMILARITY

(71) Applicant: CrowdStrike, Inc., Sunnyvale, CA (US)

(72) Inventors: Jeffrey Capone, Los Gatos, CA (US); Joshua Jones, Livermore, CA (US); Artsiom Tsai, Los Altos Hills, CA (US); Naeem Fanaeian, Damascus, MD (US)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

(21) Appl. No.: 18/142,333

(22) Filed: May 2, 2023

(65) Prior Publication Data

US 2024/0370407 A1 Nov. 7, 2024

(51) Int. Cl.
*G06F 16/17* (2019.01)
*G06F 17/16* (2006.01)

(52) U.S. Cl.
CPC .......... *G06F 16/1727* (2019.01); *G06F 17/16* (2013.01)

(58) Field of Classification Search
CPC ...... G06F 21/577; G06F 21/64; G06F 21/564; G06F 16/1727; G06F 17/16; G06F 2212/454; G06F 16/2237
See application file for complete search history.

(56) References Cited

U.S. PATENT DOCUMENTS

| | | | |
|---|---|---|---|
| 10,474,818 B1* | 11/2019 | Saxe | G06F 21/564 |
| 2004/0068396 A1* | 4/2004 | Kawatani | G06F 16/3347 |
| | | | 707/E17.08 |
| 2015/0180890 A1* | 6/2015 | Ronen | H04L 63/1416 |
| | | | 726/23 |
| 2017/0085585 A1* | 3/2017 | Morkovský | G06F 21/316 |
| 2022/0019665 A1* | 1/2022 | Perry | G06F 21/10 |
| 2022/0269794 A1* | 8/2022 | Feng | G06F 8/34 |
| 2023/0205736 A1* | 6/2023 | Horev | G06F 16/152 |
| | | | 707/747 |

FOREIGN PATENT DOCUMENTS

CN 104850783 A * 8/2015

* cited by examiner

*Primary Examiner* — William P Bartlett
(74) *Attorney, Agent, or Firm* — Womble Bond Dickinson (US) LLP

(57) ABSTRACT

A computer-implemented method of detecting similarity between a first file and a plurality of second files, the method includes generating a first vector corresponding to the first file and a plurality of second vectors each corresponding to one of the plurality of second files; determining that the first file is similar to at least one of the plurality of second files based on a comparison of the first vector to the plurality of second vectors; and responsive to determining that the first file is similar to the at least one of the plurality of second files, performing a remediation operation on the first file.

17 Claims, 8 Drawing Sheets

TECHNIQUES FOR DETECTING FILE SIMILARITY

TECHNICAL FIELD

Aspects of the present disclosure relate to detecting file similarity, and more particularly, to detecting file similarity between a file and a set of other files.

BACKGROUND

There are many instances in which it may be beneficial to compare a file, such as a newly encountered file, to a set of existing files to gain insights about the nature of the file. For instance, this type of comparison may be useful in identifying whether the file may include personal information that requires sensitive handling, whether the file may be malware, or for other reasons.

Malware is a term that refers to malicious software. Malware includes software that is designed with malicious intent to cause intentional harm and/or bypass security measures. Malware is used, for example, by cyber attackers to disrupt computer operations, to access and to steal sensitive information stored on the computer or provided to the computer by a user, or to perform other actions that are harmful to the computer and/or to the user of the computer. Malware may be formatted as executable files (e.g., COM or EXE files), dynamic link libraries (DLLs), scripts, steganographic encodings within media files such as images, and/or other types of computer programs, or combinations thereof.

Addressing malware effectively may include being able to quickly compare a particular file on a computer to other known files. For example, identifying a particular file as containing malware may include identifying that the contents of the file are similar to known malware.

Whether identifying personal information, malware, or some other file type, a number of files to be compared to determine a potential similarity may be very large. This can delay, or make impractical, a comparison of a particular file to a large set of files.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the scope of the described embodiments.

DETAILED DESCRIPTION

Figure 1:
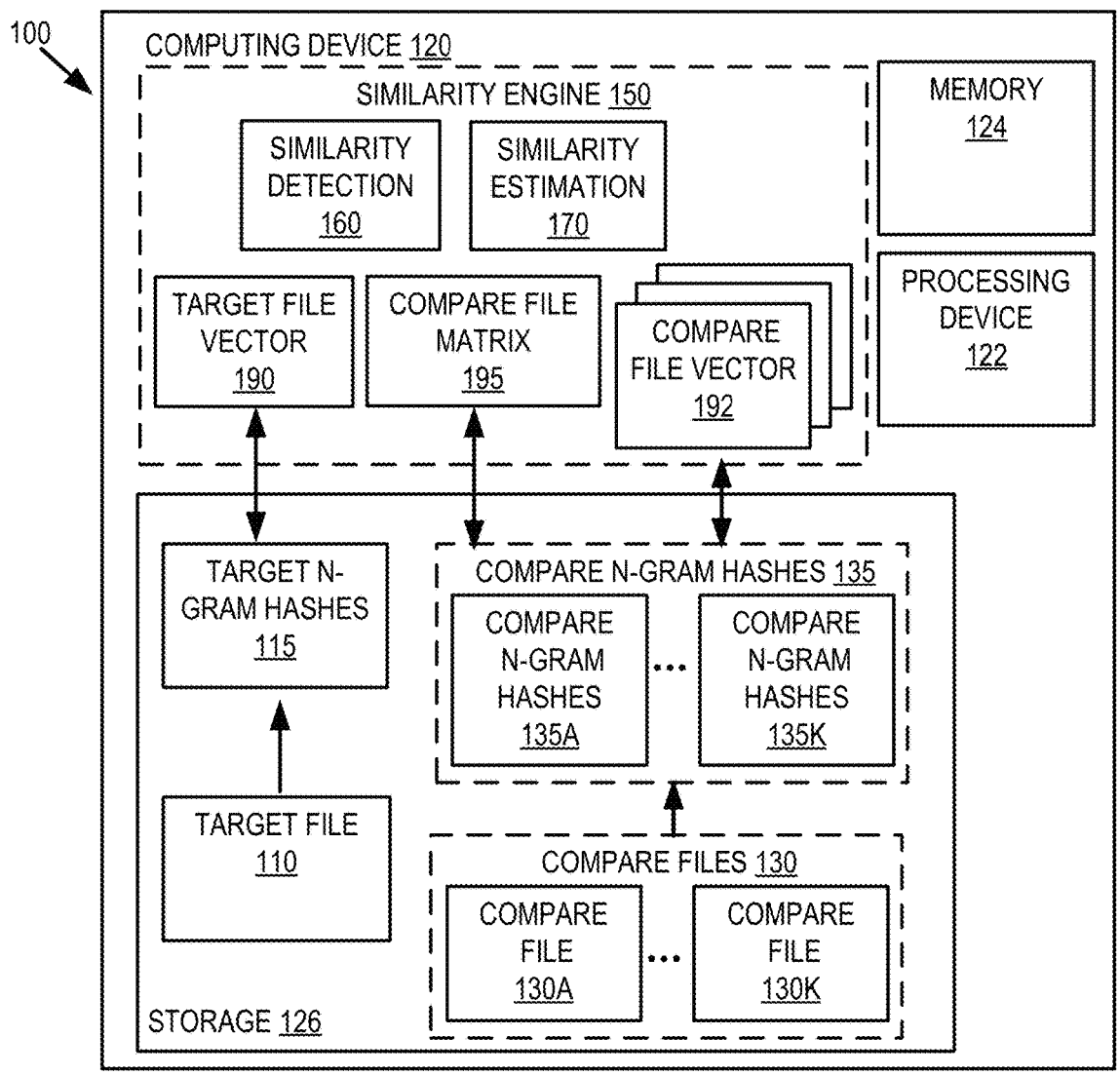
FIG. 1 is a block diagram that illustrates an example system for detecting file similarity, according to some embodiments of the present disclosure.

In some cases, being able to determine whether a particular file is similar to other files may be helpful in detecting sensitive data, combatting malware, or for other purposes. For example, it may be useful to detect whether information contained within a file is of a particular type by comparing the file to files of that particular type to determine whether the file may justify sensitive handling (i.e., in the case of personal information) or additional protection (e.g., from malware). As an example, a file may be determined to contain personal information, such as health information, based on a similarity to other files known to contain personal information. In response to the determination, the file may be treated differently than other types of files. For example, files containing health information may be marked for additional scrutiny for read/write access and/or may be encrypted. In some embodiments, a file may be identified as containing health information by detecting that it is similar to files that are known to contain health information. As another example, malware may be detected in a file by comparing the contents of the file to known malware.

Modern computer systems are subject to a large number of potential malware attacks. Examples of malware include computer viruses, worms, Trojan horses, ransomware, rootkits, keyloggers, spyware, adware, rogue security software, potentially unwanted programs (PUPs), potentially unwanted applications (PUAs), and other malicious programs. To protect from such malware, users may install scanning programs which attempt to detect the presence of malware and/or protect sensitive files from malware. These scanning programs may review programs and/or executables that exist on the computer's storage medium (e.g., a hard disk drive (HDD)) prior to execution of the file. An incoming file that is similar to a file known to contain malware may be subject to further scanning or remediation. Thus, the ability to detect a similarity between a first file and another file may be useful in detecting malware and/or protecting against malware.

The ability to detect a similarity between a first file and one or more known files of a comparison set may therefore be useful in the operation of a computer. However, comparing a file to a comparison set of files may include several challenges. For example, performing a comparison of a first file to a second file may operate acceptably, but as the number of files of the comparison set increases, the complexity of the algorithm may grow linearly (e.g., O(n)). For example, if it takes one microsecond to compare a target file to a known file, then it may take a second to compare a target against one million files, and over 16.5 minutes to compare the same target file against one billion files, and so on. Unfortunately, collections of files typically increase, rather than decrease, as more files are collected for comparison. As a result, as an amount of data is increased, the performance of a linear similarity comparison decreases. While some solutions may utilize hashing to attempt to increase the speed of the comparison, such as the use of Bloom filters, the complexity of the solutions may still be linear such that the efficiency of the solution degrades as the size of the comparison set increases. A more efficient solution for comparing a first file to a comparison set of files is therefore needed.

The present disclosure addresses the above-noted and other deficiencies by providing a vector-based solution for detecting a similarity between a first file and a comparison set of files. Some embodiments of the present disclosure may allow for the similarity determination to be broken into two phases: detection and estimation. The detection portion of the determination may transform the comparison of the first file with a set of files into a vector space. Operating in a vector space allows the use of well-defined operators such as scalar multiplication, addition, inner-product, distance measures and the application of various properties such as superposition. The use of a vector space may allow for a detection algorithm that can compare similarity between a target file and any number of files in a comparison set with constant complexity (O(1)), regardless of the number of the files to be compared.

The detection operation may detect whether the target file is similar to any of the files in the comparison set of files to be compared against. If the detection operation indicates that the target file is similar to any of the files in the comparison set of files, the determination may proceed with the estimation operation, which may be asynchronous, in which a most similar file of the comparison set of files is identified. However, since a target file will often not be sufficiently similar to any other file to warrant the estimation operation, the estimation operation may be avoided in many, and in some cases, a majority, of instances.

The embodiments described herein provide improvements over some similarity determination solutions which rely on file-to-file comparisons. The similarity determination techniques described herein may be capable of significantly reducing a number of operations needed to detect a similarity between a target file and a comparison set of files, even as the number of files in the comparison set of files increases. Embodiments according to the present disclosure may reduce an amount of computing resources needed to detect similarity and decrease the time needed to make such a determination. Embodiments of the present disclosure may also improve the scalability of operations associated with detecting a similarity of a target file with respect to a comparison set of files, allowing for larger numbers of files to be included as part of the comparison set of files without an associated linear increase in the time needed to perform the similarity determination.

Moreover, the embodiments of the present disclosure may separate the detection that a similarity exists between a target file and any of the files in a comparison set from an estimation of which file in the comparison set is most similar to the target file. Since the embodiments described herein allow for the quick determination of an initial identification of similarity to any file in the comparison set (the detection process), additional operations may be performed on the target file (e.g., remediation) even if the specific file to which the target file is most similar is not yet identified (the estimation process). Such additional operations were previously not typically performed, since the operations to fully determine similarity may be too time-intensive to support the operational latency utilized for such a full determination. Embodiments of the present disclosure may avoid such latency when a similarity is not present, and only incur such a latency when it is already known (by way of the detection process) that some level of similarity is present to a least one file in the comparison set of files. Stated another way, after a threshold determination that a target file is similar to at least one file in a set of files, remediation may begin even though it is not yet determined which specific file of the set of files is the most similar. In this way, remediation for a target file may begin sooner, without waiting for an associated latency that may be associated with the estimation operation. In some embodiments, the detection and corresponding remediation associated with a target file can be performed synchronously while the estimation and classification of the target file can be performed asynchronously. Embodiments of the present disclosure thus improve the operation of a computer by creating a more secure computing environment by selectively remediating a target file found to be similar to any file in a comparison set of files sooner, and reducing a latency that would otherwise be present when attempting to detect file similarity.

As used herein, remediation and/or a remediation operation refers to action and/or operations taken in response determining a similarity between a target file and a comparison set of files. Remediation may include such acts as providing additional protection for the target file, additional restrictions for the target file, sensitive and/or secure handling of the target file, special flagging and/or identification of the target file, quarantining of the target file, deletion of the target file, alert propagation based on the target file, and other operations intended to provide appropriate handling in response to the detected similarity. In some embodiments, the detected similarity may provide information related to a characteristic of the target file (e.g., the target file is likely to contain personal and/or sensitive information, the target file may be similar to malware, etc.) and the remediation operation is an action taken in response to that characteristic of the target file (e.g., appropriate handling for personal and/or sensitive information, protection with respect to the potential malware, etc.) The provided examples for remediation are not intended to limit the embodiments of the present disclosure. Other types of remediation may be utilized without deviation from the scope of the embodiments described herein.

Though the present disclosure describes the use of similarity determination in the context of malware and/or sensitive file remediation, the embodiments of the present disclosure are not limited to such a scenario. The embodiments of the present disclosure may be useful in other environments in which it may be useful to identify similarities between files. For example, identifying similarities in files may be useful in storage deduplication, file cataloging, file indexing, and the like. Other usage scenarios are contemplated.

FIG. 1 is a block diagram that illustrates an example system 100 for detecting file similarity, according to some embodiments of the present disclosure. FIG. 1 and the other figures may use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

As illustrated in FIG. 1, the system 100 includes a computing device 120. The computing device 120 may include hardware such as processing device 122 (e.g., processors, central processing units (CPUs)), memory 124 (e.g., random access memory (RAM), storage devices 126 (e.g., hard-disk drive (HDD)), and solid-state drives (SSD), etc.), and other hardware devices (e.g., sound card, video card, etc.).

Processing device 122 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 122 may also include one or more special-purpose processing devices such as an application specific integrated circuit (ASIC), a field programmable gate array (FPGA), a digital signal processor (DSP), network processor, or the like.

Memory 124 may include volatile memory devices (e.g., random access memory (RAM)), non-volatile memory devices (e.g., flash memory) and/or other types of memory devices. In certain implementations, memory 124 may be non-uniform access (NUMA), such that memory access time depends on the memory location relative to processing device 122. In some embodiments, memory 124 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 124 may be configured for long-term storage of data and may retain data between power on/off cycles of the computing device 120.

A storage device 126 may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Though illustrated as a separate element, in some embodiments, the storage device 126 may be part of memory 124.

The computing device 120 may comprise any suitable type of computing device or machine that has a programmable processor including, for example, server computers, desktop computers, laptop computers, tablet computers, smartphones, set-top boxes, etc. In some examples, the computing device 120 may comprise a single machine or may include multiple interconnected machines (e.g., multiple servers configured in a cluster). The computing device 120 may be implemented by a common entity/organization or may be implemented by different entities/organizations.

The computing device 120 may include a target file 110 to be compared to a set of compare files 130. The target file 110 may be any binary object, and may include text, audio, video, computer instructions codes, or the like. The set of compare files 130 may include a plurality of files 130A up to 130K. The number of compare files 130 illustrated in FIG. 1 is merely for purposes of illustration, and is not intended to limit the embodiments of the present disclosure. The target file 110 and/or the compare files 130 may be stored in the storage device 126, though the embodiments of the present disclosure are not limited to such a configuration. In some embodiments, the target file 110 and/or the compare files 130 may be stored remotely from the computing device 120.

As illustrated in FIG. 1, a similarity engine 150 may be configured to compare a similarity between the target file 110 and each of the compare files 130. As used herein, a first file is considered similar to a second file if at least a portion of the contents of the first file are identical to the contents of the second file. As used herein with respect to similarity, portions of a file being identical refers to the portions having a same binary content (e.g., 1 or 0) at a same position within the portion. The amount of the first file that is to be identical the second file to be considered similar may vary in some embodiments, but the first file and the second file need not be completely identical (i.e., one or both of the first file and the second file may include portions not included in the other). For example, in some embodiments, one kilobyte of identical contiguous contents between two files may be sufficient to determine that the two files are similar. In some embodiments, four kilobytes of identical contiguous contents between two files may be sufficient to determine that the two files are similar. Other amounts, either smaller or larger, may be utilized without deviating from the embodiments of the present disclosure. In some embodiments, the first file may be considered similar to the second file if the portion of the contiguous contents of the first file are identical to the contiguous contents of the second file, regardless of a position of the contiguous contents within the respective files. For example, the first file may be considered similar to the second file if a portion at the beginning of the first file is identical to a portion at the end of the second file.

As part of determining a similarity between the target file 110 and the compare files 130, the computing device 120 may generate a plurality of target n-gram hashes 115 corresponding to the target file 110. The target n-gram hashes 115 may represent a set of hashes of portions of the target file 110 (n-gram hashes 220, described further herein with respect to FIGS. 2 and 2B), which may provide a signature of different portions of the target file 110. In some embodiments, a hash of a file, such as target file 110, may provide a digital fingerprint of the file, which may uniquely identify its contents. When a hash is made of a whole file, an identical file may be found by detecting another file having the same whole-file hash. However, using a hash of the entire file may be less effective at attempting to determine similarities between files that are mostly, but not entirely, similar. Altering just one byte in a file may change the hash and thus make the file appear non-similar. This may be an issue in some environments, such as malware, in which attempts may be made to disguise the contents of the file.

Figure 2A:
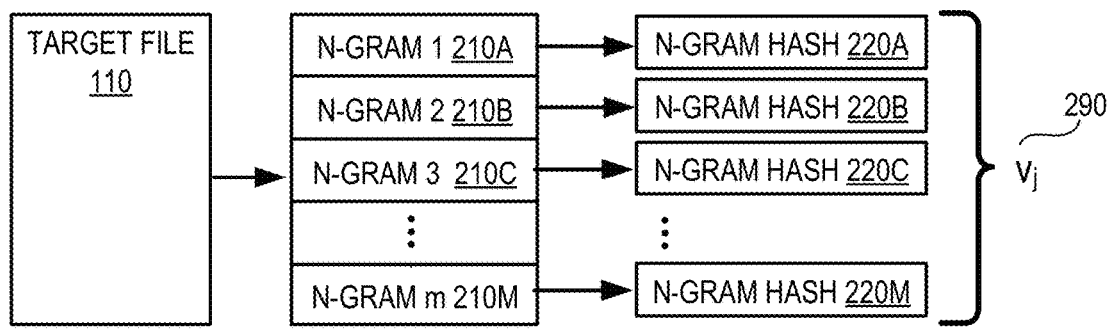
FIG. 2A is a block diagram illustrating a piecewise file hash of the target file and a resulting hash vector, in accordance with some embodiments of the present disclosure.

To address this issue in order to detect files which may have partial similarity, portions of the file may be hashed instead. FIG. 2A is a block diagram illustrating a piecewise file hash of the target file 110 and a resulting hash vector 290 (also referred to herein as an n-gram vector and/or $v_j$), in accordance with some embodiments of the present disclosure. A description of elements of FIG. 2A that have been described previously will be omitted for brevity.

Referring to FIG. 2A, the target file 110 may be analyzed to break the target file 110 into a plurality of byte n-grams 210 (also referred to herein as n-grams 210). A byte n-gram 210 is a contiguous sequence of n bytes (where n is an integer) within the target file 110. In some embodiments, the integer n used to delineate the n-grams 210 may be 1024 or other fixed size, but this is merely an example and is not intended to limit the embodiments of the present disclosure. In some embodiments, the integer n used to delineate the n-grams 210 may be variable. For example, in some embodiments, the different n-grams 210 may be based on an analysis of the target file 110. For example, in some embodiments, various anchoring points may be identified within the target file 110. An anchoring point may include an offset within the target file 110 in which the bytes of a substring around the anchoring point have a high probability of maintaining their existence when the target file 110 changes. For example, a sliding window of a fixed length may be used. The use of anchoring points is described, for example, by Udi Manber (Manber, Udi. "Finding Similar Files in a Large File System." USENIX Winter (1994)). The sliding window may be advanced across the binary sequence of the target file 110 until a hash (or entropy) value of the contents enclosed by the window is some constant, and an anchor point may be set at this location.

In some embodiments, the first n bytes of the target file 110 may form a first n-gram 210A, the second n bytes of the target file 110 may form a second n-gram 210B, the third n bytes of the target file 110 may form a third n-gram 210C, and so on, up until the last sequence of n bytes are grouped into an $m^{th}$ n-gram 210M. The number of n-grams 210 illustrated in FIG. 2A are merely examples, and the embodiments of the present disclosure are not limited to such a configuration. In some embodiments, the n-grams 210 may cover all portions of the target file 110. In some embodiments, the n-grams 210 may cover less than all of the target file 110. For example, anchor points may be identified in specific locations within the target file 110, and the n-grams 210 may be formed based on the anchor points.

Once the plurality of n-grams 210 have been delineated for the target file 110, a respective n-gram hash value 220 may be generated for each of the n-grams 210 of the target file 110. For example, a first n-gram hash 220A may be generated for the first n-gram 210A, a second n-gram hash 220B may be generated for the second n-gram 210B, a third n-gram hash 220C may be generated for the third n-gram 210C, and so on, up until a last n-gram hash 220M may be generated for the $m^{th}$ n-gram 210M. The number of n-gram hashes 220 illustrated in FIG. 2A are merely examples, and the embodiments of the present disclosure are not limited to such a configuration. The n-gram hashes 220 may be an output of a hashing algorithm performed on respective n-grams 210, such as MD5 (message digest 5), SHA (secure hash algorithm), Context Triggered Piecewise Hashing (CTPH), and the like, that generates a string as a hash value. In some embodiments, CTPH hashes, such as sdhash or ssdeep may be utilized.

Still referring to FIG. 2A, an n-gram vector 290 (illustrated as $v_j$) may be generated from the n-gram hashes 220. In some embodiments, the n-gram vector 290 may include coordinates for each of the possible hashes of the n-gram hashes 220. For example, for a hash of L bits, the total number of possible n-gram hashes 220 is $2^L$. The set of possible n-gram hashes 220 may be represented as $\{g_1, g_2, \ldots, g_k\}$. Based on this designation, a value B may be selected. Let $B=\{b_1, b_2, \ldots, b_k\}$ such that, $$b_1 = [g_1\ 0\ 0\ \ldots\ 0]$$

-continued
$$b_2 = [0\ g_2\ 0\ \ldots\ 0]$$
$$\vdots$$
$$b_k = [0\ 0\ 0\ \ldots\ g_k].$$

Therefore, B may be utilized for a basis for the vector space, V, where every target file 110 may be represented as a mapping to an n-gram vector $v_j$ 290 that is a linear combination of elements in B. For example, all of the n-gram hashes 220 of the target file 110 may be represented as $F(f_j)$. Thus, $$F(f_j)=\{h_1,h_2,\ldots,h_m\}$$

where $h_1$ to $h_m$ represent the n-gram hashes 220 of the various n-grams 210 of the target file 110.

The conversion from the target file 110 to the n-gram vector $v_j$ 290 may then be represented by:

$$F(f_j) \to v_j = a_1 b_1 + a_2 b_2 + \ldots + a_k b_k$$

$$v_j=[a_1 a_2 \ldots a_k]$$

where $a_i \in \{0, 1, 2, \ldots, \infty\}$. For example, a target file 110 with all c's (e.g., the contents of the target file 110 are all a single value 'c') will have one coordinate in the vector with a large value (representing an n-gram hash 220 of an n-gram 210 containing only the value 'c') and the rest will be 0's. This mapping, $F(f_j) \to v_j$, may be onto, but not one-to-one. Therefore, the n-gram vector $v_j$ 290 may not be index preserving.

In some embodiments, a similarity of two binary strings, $f_j$ and $f_k$, is measured as:

$$S(f_j, f_k) = 2 \frac{|F(f_j) \cap F(f_k)|}{||F(f_j)| + |F(f_k)||}$$

given this similarity, for any two files, $f_j$ and $f_k$, mapped to the same n-gram vector $v_j$ 290 the following is true:

$$S(f_j,f_k)=1$$

As noted above, the n-gram vector 290 may have a coordinate for each possible n-gram hash value 220. Thus, for a given target file 110, a coordinate in the vector space of the n-gram vector 290 may be incremented for each time a particular hash value occurs among the n-gram hash values 220.

Figure 2B:
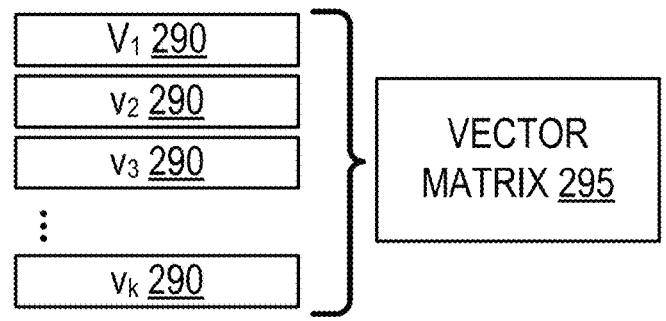
FIG. 2B is a block diagram illustrating the generation of a vector matrix from a plurality of n-gram vectors, in accordance with some embodiments of the present disclosure.

Once an n-gram vector 290 has been generated for a particular target file 110, multiple n-gram vectors 290 may be combined into a vector matrix 295. FIG. 2B is a block diagram illustrating the generation of a vector matrix 295 from a plurality of n-gram vectors 290, in accordance with some embodiments of the present disclosure. A description of elements of FIG. 2B that have been described previously will be omitted for brevity.

As illustrated in FIG. 2B, n-gram vectors $v_1$ to $v_k$ 290 may be generated for each of the compare files 130 (e.g., compare file 130A to compare file 130K, as illustrated in FIG. 1). Each of those n-gram vectors 290 may be generated based on the n-gram hashes 220 of each of the compare files 130. The n-gram vectors 290 may be combined to generate a vector matrix 295. For example, the vector matrix 295 may be generated as:

$$F_k = \begin{bmatrix} v_1 \\ v_2 \\ \vdots \\ v_k \end{bmatrix}$$

where k is the number of files (e.g., compare files 130) that have been observed, and $v_1$ to $v_k$ are the n-gram vectors 290 formed from the n-gram hashes 220 of the files. The vector matrix $F_k$ 295 may be very sparse and highly compressible.

Referring to FIGS. 1, 2A, and 2B, a set of target n-gram hashes 115 may be generated for the target file 110. In some embodiments, the target n-gram hashes 115 may be generated in a same manner as the n-gram hashes 220 described with respect to FIG. 2A. In addition, a plurality of compare n-gram hashes 135 may be generated. In some embodiments, the plurality of compare n-gram hashes 135 may be generated for each of the compare files 130 in a same manner as the n-gram hashes 220 described with respect to FIG. 2A. For example, a first set of compare n-gram hashes 135A may be generated from a first compare file 130A, and a $k^{th}$ compare n-gram hash 135K may be generated for a $k^{th}$ compare file 130K.

In addition, a target file vector 190 may be generated for the target n-gram hashes 115 of the target file 110. In some embodiments, the target file vector 190 may be generated in a same manner as the n-gram vector 290 described with respect to FIG. 2A. In addition, a plurality of compare file vectors 192 may be generated for each of the compare n-gram hashes 135 associated with the compare files 130. In some embodiments, the compare file vectors 192 may be generated for each of compare n-gram hashes 135 in a same manner as described with respect to FIG. 2A. In addition, a compare file matrix 195 may be generated based on the set of compare file vectors 192 associated with the compare files 130. In some embodiments, the compare file matrix 195 may be generated in a same manner as described for the creation of the vector matrix 295 with respect to FIG. 2B. For example, each of the compare file vectors 192 may be combined into the compare file matrix 195.

The target file vector 190, the compare file matrix 195, and the compare file vectors 192 may be utilized by the similarity engine 150 to determine a similarity of a target file 110 to the compare files 130. For example, the similarity engine 150 may be broken into a similarity detection engine 160 and a similarity estimation engine 170. In some embodiments, the similarity detection engine 160 may be configured to detect whether the target file 110 is similar to any of the compare files 130, while the similarity estimation engine 170 may be configured to detect to which of the compare files 130 the target file 110 is most similar. In some embodiments, the similarity estimation engine 170 may be utilized in response to the similarity detection engine 160 determining that the target file 110 is similar to any one of the compare files 130. In some embodiments, if the similarity detection engine 160 determines that the target file 110 is not similar to any of the compare files 130, an operation of the similarity estimation engine 170 may be omitted and/or avoided with respect to the target file 110.

Figure 3:
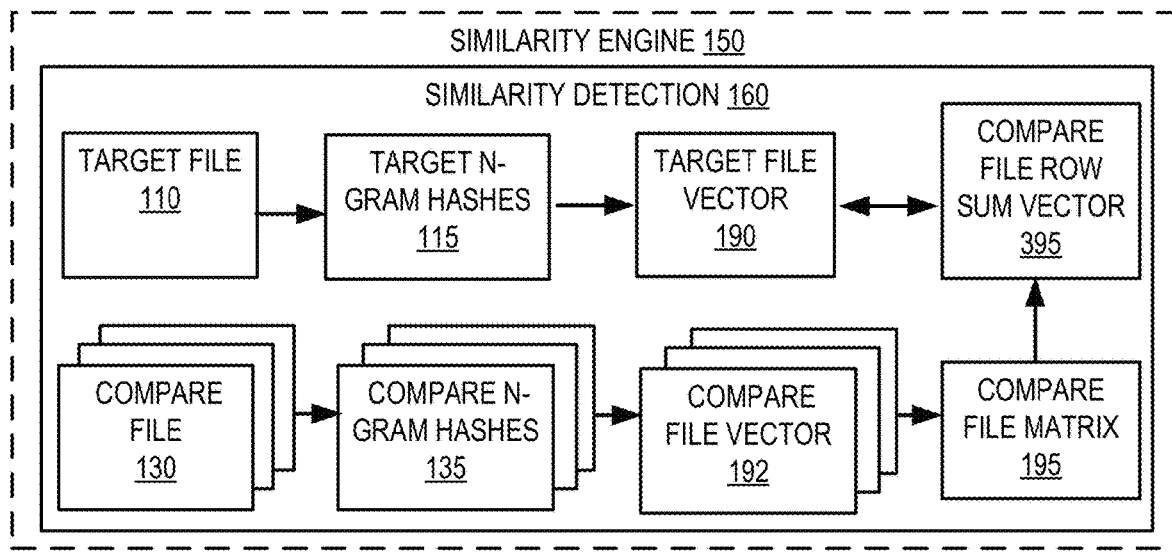
FIG. 3 is a block diagram illustrating an operation of the similarity detection engine, in accordance with some embodiments of the present disclosure.

FIG. 3 is a block diagram illustrating an operation of the similarity detection engine 160, in accordance with some embodiments of the present disclosure. A description of elements of FIG. 3 that have been described previously will be omitted for brevity.

Referring to FIG. 3, a plurality of target n-gram hashes 115 may be generated from the target file 110. The target n-gram hashes 115 may be generated in a similar manner as described herein with respect to FIGS. 1 and 2A. In addition, a plurality of compare n-gram hashes 135 may be generated from respective ones of the compare files 130. The compare n-gram hashes 135 may be generated in a similar manner as described herein with respect to FIGS. 1 and 2A.

A target file vector 190 may be generated from the target n-gram hashes 115 in a similar manner as described herein with respect to FIGS. 1 and 2A. Namely, values of the target n-gram hashes 115 may be mapped to coordinates of the target file vector 190. In addition, a compare file matrix 195 may be generated in a similar manner as described herein with respect to FIGS. 1 and 2B. Namely, values of the compare n-gram hashes 135 may be mapped to coordinates of a compare file vector 192 for each of the compare files, and the resulting compare file vectors 192 may be combined to form the compare file matrix 195. Though illustrated in a same figure in FIG. 3, the generation of the compare file matrix 195 and the target file vector 190 may occur at different times. For example, in some embodiments, the compare file matrix 195 may be generated in advance from a known set of compare files 130. Thus, for detecting a similarity of a given target file 110, the operations of the similarity detection engine 160 may be reduced to include the generation of the target file vector 190 and a comparison to a pre-generated compare file matrix 195.

To detect whether the target file 110 is similar to any of the compare files 130, a comparison may be made between the target file vector 190 and a superposition all of the rows of the compare file matrix 195. For example, let $d_k$ be the superposition of all the rows of the compare file matrix 195, designated as $F_k$:

$$d_k = \sum_{i=1}^{k} v_i$$

For example, $d_k$ may represent a compare file row sum vector 395 of all the rows of the compare file matrix 194. To detect whether a target file vector 190, represented as $v_j$ has similarity to any compare file 130 in the compare file matrix 195 ($F_k$), the following operation may be performed $$\langle d_k, v \rangle$$

where $\langle \ \rangle$ is an inner product operation performed on the superposition of all of the rows of the compare file matrix 195 (e.g., the compare file row sum vector 395) and the target file vector 190. If the result of the operation is zero, then $v_j$ (e.g., the target file vector 190) is orthogonal to all vectors in $F_k$ (e.g., the compare file matrix 195), and therefore the target file 110 is not similar to any of the compare files 130 of the compare file matrix 195.

In some embodiments, the use of the target file vector 190 to detect similarity may perform much better than a pairwise comparison to all of the compare files 130. The complexity of this detection operation does not change with the number of files and therefore detection is O(1). Moreover, by utilizing the target file vector 190, vector operations may be utilized to quickly incorporate the target file 110 as one of the compare files 130. For example, the compare file matrix 195 ($F_k$) may be updated to $F_{k+1}$ by appending the target file vector 190 ($v_j$) and the compare file row sum vector 395 ($d_k$) may be updated to ($d_{k+1k}$) by adding the target file vector 190 to the compare file row sum vector 395 ($d_k$) (e.g., $d_{k+1} = d_k + v_j$).

Figure 4:
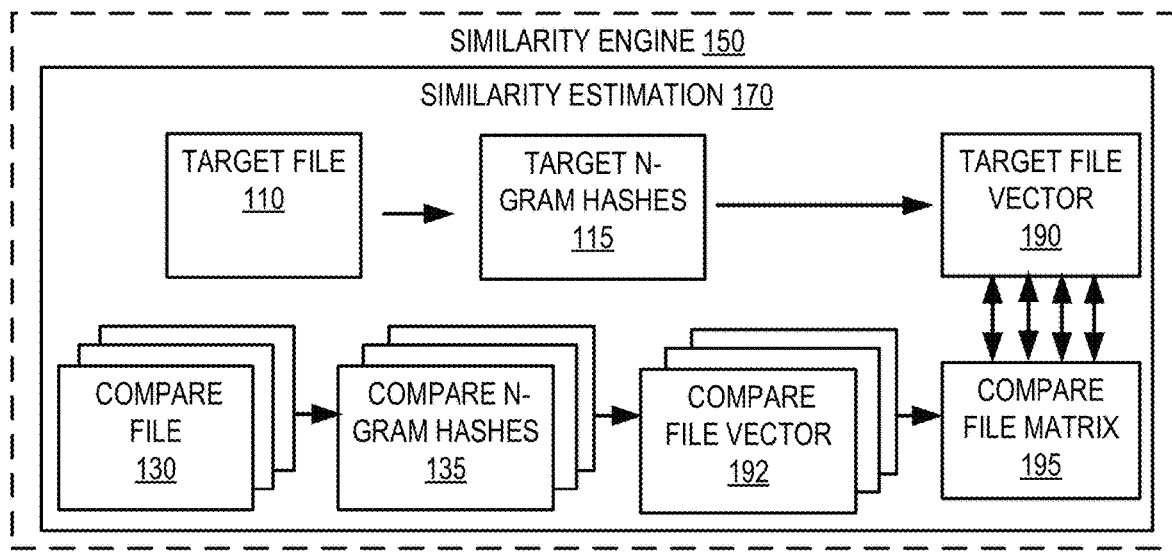
FIG. 4 is a block diagram illustrating an operation of the similarity estimation engine, in accordance with some embodiments of the present disclosure.

FIG. 4 is a block diagram illustrating an operation of the similarity estimation engine 170, in accordance with some embodiments of the present disclosure. A description of elements of FIG. 4 that have been described previously will be omitted for brevity. As noted above, in some embodiments, the similarity estimation engine 170 may be utilized in response to the similarity detection engine 160 determining that a target file 110 is similar to at least one compare file 130 of the set of compare files 130.

Referring to FIG. 4, a plurality of target n-gram hashes 115 may be generated from the target file 110. The target n-gram hashes 115 may be generated in a similar manner as described herein with respect to FIGS. 1 and 2A. In addition, a plurality of compare n-gram hashes 135 may be generated from respective ones of the compare files 130. The compare n-gram hashes 135 may be generated in a similar manner as described herein with respect to FIGS. 1 and 2A.

A target file vector 190 and a plurality of compare file vectors 192 may be generated in a similar manner as described herein with respect to FIGS. 1 and 2A. In addition, a compare file matrix 195 may be generated from the compare file vectors 192 in a similar manner as described herein with respect to FIGS. 1 and 2B. Though illustrated in a same figure in FIG. 4, the generation of the compare file matrix 195 and the target file vector 190 may occur at different times. For example, in some embodiments, the compare file matrix 195 may be generated in advance from a known set of compare files 130. Thus, for detecting a similarity of a given target file 110, the operations of the similarity estimation engine 170 may be reduced to the generation of the target file vector 190.

To detect whether the target file 110 is similar to particular one of the compare files 130, a comparison may be made between the target file vector 190 and various rows of the compare file matrix 195. For example, to measure the similarity of the target file vector 190 $s(v_j)$ only the non-zero coordinates of the target file vector 190 $(v_j)$ need to be multiplied with the corresponding rows of the compare file matrix 195 $(F_k)$ with the following operation:

$$s(v_j) = \frac{F_k v_j^T}{\|v_j\|^2}$$

In some embodiments, these operations may include methods to multiply sparse matrices, which may reduce the complexity.

The most similar file to the target file 110 is $f_k$, where k is the index of $s(v_j)$ that satisfies:

$$\max_{s(v_j)} a_i$$

The complexity of the similarity operation, $s(v_j)$, is $O(n)$

Even though the complexity of this similarity estimations operation is $O(n)$, the operations may not be performed in a majority of circumstances, because the similarity detection engine 160 may often find that the target file 110 is not similar to any of the compare files 130, saving large amounts of computing resources. In addition, the vector operations utilized by the similarity estimation engine 170 may perform favorably as compared to hash comparison, thus the similarity of the target file 110 with respect to each of the compare files 130 may be performed more quickly than in some conventional operations.

In some embodiments, the target file vector 190 and/or the compare file matrix 195 may be implemented as data structures that simulate vector operations. For example, the target n-gram hashes 115 and/or the compare n-gram hashes 135 may be stored in a dictionary and/or map. For example, the target n-gram hashes 115 may be stored in a first map and the compare n-gram hashes 135 may be stored in the second map. In some embodiments, the maps may be unordered maps (e.g., hash maps).

To determine similarity between the two maps, and thus between the target file 110 and one of the compare files 130, a function to multiply the two maps may be used, which is effectively the same as the inner product of the target file vector 190 and the compare file matrix 196.

For each element in the first map (e.g., the target file vector 190), if the element is found in the second map (e.g., the compare file matrix 195), a similarity may be indicated. The use of unordered maps may save storage space since the information stored in the maps are the hashes calculated and the number of times each hash has been seen. Hashes (e.g., target n-gram hashes 115 and/or compare n-gram hashes 135) that have not been seen (e.g., have a coordinate of 0 in the vector space) may not incur any storage resources within the map.

As an example only, a map may be defined as:

std:unordered_map<uint64_t, uint32_t>;

and the map elements may be populated, for example, using a code snippet similar to the following:

$$map1[\text{hash}] \mathrel{+}= 1;$$

To multiply the two maps, once populated, a code snippet similar to the following may be used:

```
uint64_t result = 0;
for (auto& entry : map1)
{
    const auto entry2 = map2.find(entry.first);
    if (entry2 != map2.end( ))
    {
        result += entry.second * entry2->second;
    }
}
```

The above operation may identify the number of matches within the map. If the number of matches is not needed, a code example similar to the following may be used:

```
for (auto& entry : map1)
{
    const auto entry2 = map2.find(entry.first);
    if (entry2 != map2.end( ))
    {
        break;
    }
}
```

The utilization of unordered maps may increase the performance of the operations of either the similarity detection engine 160 and/or the similarity estimation engine 170 even further. The above code is merely an example provided to aid in understanding, and is not intended to limit the embodiments of the present disclosure.

Figure 5:
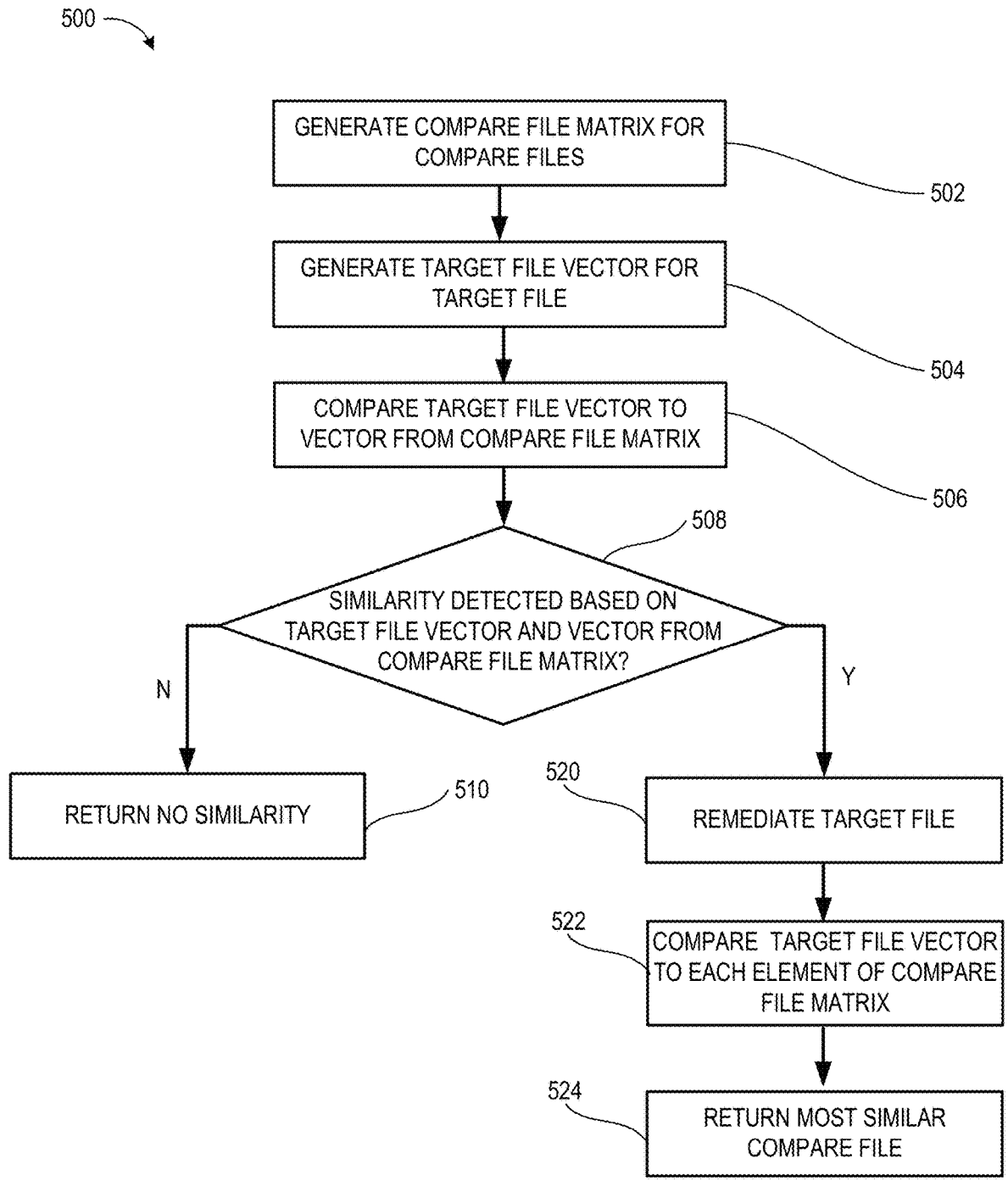
FIG. 5 is a flow diagram of a method for determining a similarity between a target file and a set of compare files, in accordance with some embodiments of the present disclosure.

FIG. 5 is a flow diagram of a method 500 for determining a similarity between a target file 110 and a set of compare files 130, in accordance with some embodiments of the present disclosure. A description of elements of FIG. 5 that have been described previously will be omitted for brevity.

Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a computing device (e.g., computing device 120).

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Referring simultaneously to the prior figures as well, the method 500 begins at block 502, in which a compare file matrix 195 may be generated for a set of compare files 130. For example, compare file vectors 192 may be generated for each compare file 130 of the set of compare files 130. The compare file vectors 192 may be generated based on compare n-gram hashes 135 generated from the compare files 130, as described herein with respect to FIGS. 1 and 2A. The compare file matrix 195 may be generated based on the compare file vectors 192, as described herein with respect to FIGS. 1 and 2B.

At block 504, a target file vector 190 may be generated for the target file 110. The target file vector 190 may be generated based on target n-gram hashes 115 generated from the target file 110, as described herein with respect to FIGS. 1 and 2A.

At block 506, the target file vector 190 may be compared to a vector generated from the compare file matrix 195 (e.g., the compare file row sum vector 395). For example, an inner product may be taken of the target file vector 190 and compare file row sum vector 395 generated from the compare file matrix 195, as described herein with respect to FIG. 3. The inner product or similar operation may indicate whether the target file 110 represented by the target file vector 190 is similar to any of the compare files 130 represented by the compare file matrix 195.

At block 508, it may be determined whether a similarity is detected based on the target file vector 190 and the vector generated from the compare file matrix 195. For example, if the inner product of the target file vector 190 and the compare file row sum vector 395 generated from the compare file matrix 195 is non-zero, a similarity may exist between the target file 110 and at least one of the compare files 130. If a similarity is not determined based on the target file vector 190 and the row sum vector of the compare file matrix 195 ('N' in FIG. 5), the method 500 may continue to block 510, where a value is returned indicating that no similarity exists between the target file 110 and any of the compare files 130.

If a similarity is determined between the target file vector 190 and the compare file matrix 195 ('Y' in FIG. 5), the method 500 may continue to block 520. At block 520, the target file 110 may be remediated. For example, the target file 110 may be isolated to prevent further access to the target file 110 or execution of the target file 110 if the target file 110 is an executable. In some embodiments, remediation of the target file 110 may include quarantining of the target file 110. In some embodiments, remediating the target file 110 may include providing greater levels of protection and/or restriction of the target file 110. For example, the target file 110 may have access controls set so that administrative access is required to view and/or manipulate the target file 110. Other types of remediation may be performed with respect to the target file 110 without deviating from the embodiments of the present disclosure.

At block 522, the target file vector 190 may be compared to each element of the compare file matrix 195. This comparison may be performed by analyzing the various components of the compare file matrix 195, as described herein with respect to FIG. 4. This comparison may allow for an analysis of a similarity of the target file 110 to each of the compare files 130 represented in the compare file matrix 195.

At block 524, the compare file 130 that is most similar to the target file 110 may be returned. For example, the analysis of block 522 may indicate which element of the compare file matrix 195 has the maximum overlap with the target file vector 190. This element may indicate the compare file 130 that is most similar to the target file 110. The compare file 130 associated with this most-similar element of the compare file matrix 195 may be returned as part of the operations of block 524.

Figure 6A:
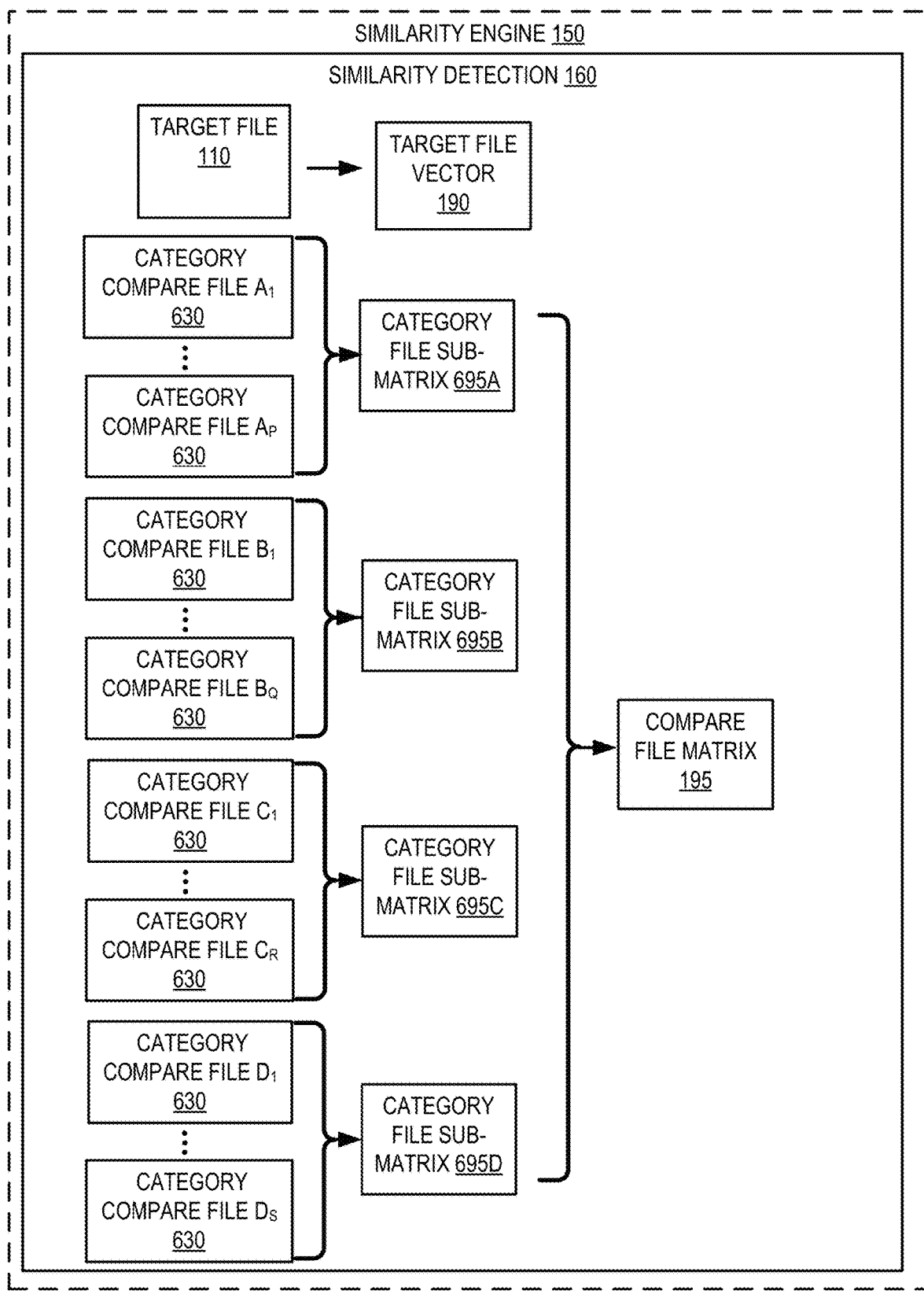
FIG. 6A is a schematic block diagram illustrating the use of a plurality of compare file matrices as part of a similarity detection engine, in accordance with some embodiments of the present disclosure.

Though FIGS. 1 to 5 illustrate the use of a single compare file matrix 195, the embodiments of the present disclosure are not limited to such a configuration. FIG. 6A is a schematic block diagram illustrating the use of a plurality of compare file sub-matrices 695 as part of a similarity detection engine 160, in accordance with some embodiments of the present disclosure. In some embodiments, different compare file sub-matrices 695 may be used to add additional functionality to the similarity detection engine 160 as part of the similarity engine 150.

Referring to FIG. 6A, a target file vector 190 may be generated based on the target file 110, as described herein. In the example of FIG. 6A, the compare files 130 of the prior figures may be represented as category compare files 630 that are broken up into a plurality of categories. For example, P compare files 630 may be identified as belonging to a first category A. As a result, category compare files 630 associated with the first category may be determined from $A_1$ to $A_P$. Q compare files 630 may be identified as belonging to a second category B. As a result, category compare files 630 associated with the second category may be determined from $B_1$ to $B_Q$. R compare files 630 may be identified as belonging to a third category C. As a result, category compare files 630 associated with the third category may be determined from $C_1$ to $C_R$. S compare files 630 may be identified as belonging to a fourth category D. As a result, category compare files 630 associated with the fourth category may be determined from $D_1$ to $D_S$.

The first through fourth categories may refer to types of data and/or files that may be determined, in part, based on the contents of the category compare files 630. Examples of categories include financial information, health information, personal identifiable information (PII), secret information, malware-based information, and the like. PII includes information that permits the identity of an individual to whom the information applies to be reasonably inferred by either direct or indirect means. Thus, a category compare file 630 that is identified to contain PII may be associated with and/or categorized as a PII category. Similarly, a category compare file 630 that is identified to contain financial information may be associated with and/or categorized as a financial category. A category compare file 630 that is identified to contain malware may be associated with and/or categorized as a malware category. Though FIG. 6A illustrates that a category compare file 630 is associated with one category, this is merely for ease of description, and the embodiments of the present disclosure are not limited to such a configuration. In some embodiments, a category compare file 630 may be associated with a plurality of categories.

As illustrated in FIG. 6A, the category compare files 630 may be grouped into categories. Each of the categories may be analyzed to generate a category file submatrix 695. For example, as illustrated with respect to FIGS. 1, 2A, and 2B, each of the category compare files 630 may be delineated into a plurality of n-grams 210, each of which may be transformed into a compare n-gram hash 135. The compare n-gram hashes 135 may be converted to compare file vectors 192, which may subsequently be transformed into a category file submatrix 695, as described herein with respect to FIG. 2B. The category file submatrix 695 may differ from the compare file matrix 195 in that the category file submatrix 695 may represent the category compare files 630 for a particular category, rather than all of the category compare files 630, as with the compare file matrix 195.

For example, a first category file sub-matrix 695A may be generated for the category compares files 630 associated with the first category A, a second category file sub-matrix 695B may be generated for the category compares files 630 associated with the second category B, a third category file sub-matrix 695C may be generated for the category compares files 630 associated with the third category C, and a fourth category file sub-matrix 695D may be generated for the category compares files 630 associated with the fourth category D. The compare file matrix 195 may be generated based on the various category file sub-matrices 695 and/or the category compare files 630.

The use of the category file sub-matrices 695 may allow for an analysis of similarities between a target file 110 and categories of files. For example, a comparison may be made between the target file vector 190 and the compare file matrix 195, as described herein (e.g., by generating a compare file row sum vector 395 of the compare file matrix 195 and performing an inner product of the target file vector 190 and the compare file row sum vector 395). If a similarity is found, a further comparison may be made between the target file vector 190 and one or more of the various category file sub-matrices 695. The comparison between the target file vector and a category file sub-matrix 695 may be performed similarly to that of the comparison between the target file vector 190 and the compare file matrix 195. For example, an inner product may be performed between the target file vector 190 and a row sum vector generated from the category file sub-matrix 695. If the result is non-zero, it may indicate that the target file 110 is similar to at least one file in the category compare files 630 represented by the category file sub-matrix 695.

The embodiments illustrated in FIG. FIG. 6A allow for a categorization of the target file 110 to be made. For instance, if it is determined that the target file 110 is similar to at least one of the category compare files 630 (e.g., by comparison to the compare file matrix 195) further comparisons may be made to each of the category file sub-matrices 695 to determine to which category or categories the target file 110 is similar. As an example, the target file 110 may be determined to be similar to at least one of the category compare files 630 through analysis with respect to the compare file matrix 195. Through analysis with respect to each of the category file sub-matrices 695, it may be determined that the target file 110 is similar to category compare files 630 of the financial category, but is not similar to category compare files 630 of the malware category. This may allow for a different type of remediation with respect to the target file 110.

Figure 6B:
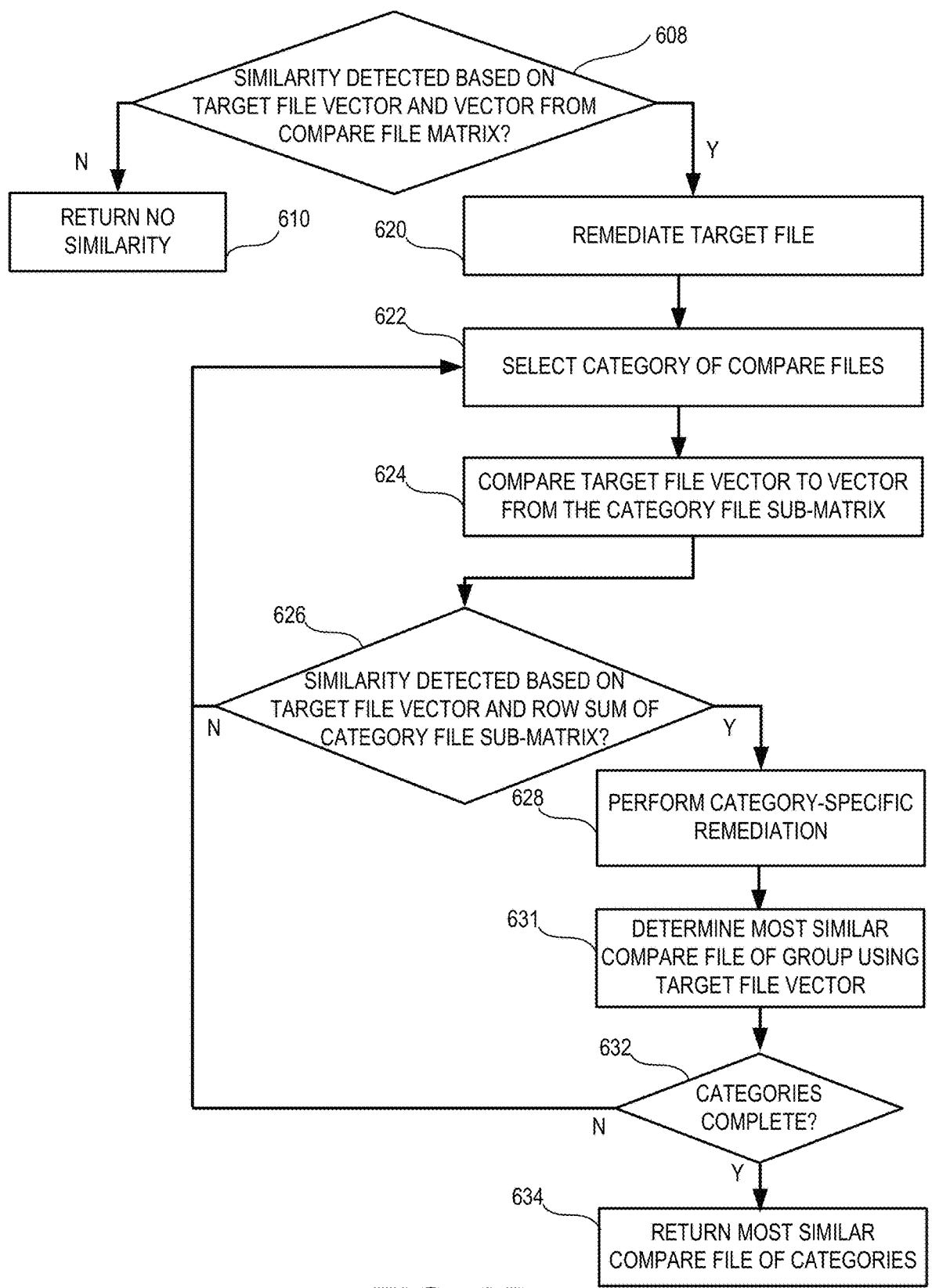
FIG. 6B is a flow diagram of a method of detecting similarity in a target file using categories, in accordance with some embodiments of the present disclosure.

FIG. 6B is a flow diagram of a method 600 of detecting similarity in a target file 110 using categories, in accordance with some embodiments of the present disclosure. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 600 may be performed by a computing device (e.g., computing device 120).

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

In FIG. 6B, it is assumed that the target file vector 190, the compare file matrix 195, and/or the category file sub-matrices 695 have already been generated (e.g., using techniques described herein with respect to the prior figures). Referring simultaneously to the prior figures as well, the method 600 begins at block 608, in which it is determined whether a similarity is detected based on the target file vector 190 and a vector generated from the compare file matrix 195. For example, if the inner product of the target file vector 190 and a compare file row sum vector 395 generated from the compare file matrix 195 is non-zero, a similarity may exist between the target file 110 and at least one of the category compare files 630. If a similarity is not determined based on the target file vector 190 and the vector generated from the compare file matrix 195 (block 608: N in FIG. 6), the method 600 may continue to block 610, where a value is returned indicating that no similarity exists between the target file 110 and any of the category compare files 630.

If a similarity is determined based on the target file vector 190 and the compare file matrix 195 (block 608: Y in FIG. 6), the method 600 may continue to block 620. At block 620, the target file 110 may be remediated. For example, the target file 110 may be isolated to prevent further access to the target file 110 or execution of the target file 110 if the target file 110 is an executable. In some embodiments, remediation of the target file 110 may include quarantining of the target file 110. In some embodiments, remediating the target file 110 may include providing greater levels of protection and/or restriction of the target file 110. For example, the target file 110 may have access controls set so that administrative access is required to view and/or manipulate the target file 110. Other types of remediation may be performed with respect to the target file 110 without deviating from the embodiments of the present disclosure.

At block 622, one of the categories of the category compare files 630 may be selected. For example, a first category A, a second category B, and so on (e.g., financial, health, PII, malware, etc.) may be selected from the plurality of categories.

At block 624, the target file vector 190 may be compared to a vector generated from the category file sub-matrix 695 associated with the selected category. For example, an inner product may be taken of the target file vector 190 and a row sum vector generated from the selected category file sub-matrix 695, as described herein with respect to FIG. 3. The inner product or similar operation may indicate whether the target file 110 represented by the target file vector 190 is similar to any of the category compare files 630 of the selected category represented by the associated category file sub-matrix 695.

At block 626, it may be determined whether a similarity is detected based on the target file vector 190 and the vector generated from the category file sub-matrix 695. For example, if the inner product of the target file vector 190 and the row sum vector of the category file sub-matrix 695 is non-zero, a similarity may exist between the target file 110 and at least one of the category compare files 630 of the selected category. If a similarity is not determined based on the target file vector 190 and the category file sub-matrix 695 (block 626: N in FIG. 6), the method 600 may revert to block 622 in which another of the categories is selected.

If a similarity is determined based on the target file vector 190 and the category file sub-matrix 695 (block 626: Y in FIG. 6), the method 600 may continue to block 628. At block 628, category-specific remediation may be performed on the target file 110. For example, depending on the detected category of the target file 110, different types of remediation may be performed. For example, if the target file 110 is determined to be similar to files in the malware category, the target file 110 may be quarantined and/or deleted. As another example, if the target file 110 is determined to be similar to files in the PII category, the target file 110 may be encrypted, or have access permissions selected so that higher permissions are required to access the target file 110. Other types of remediation may be performed beyond these examples without deviating from the scope of the present disclosure.

At block 631, the target file vector 190 may be compared to each element of the category file sub-matrix 695. This comparison may be performed by analyzing the various components of the category file sub-matrix 695, as described herein with respect to FIG. 4. This comparison may allow for an analysis of a similarity of the target file 110 to each of the category compare files 630 represented in the category file sub-matrix 695.

At block 632, it may be determined whether all of the categories have been processed. If all of the categories have not yet been analyzed (block 632: N in FIG. 6), the method 600 may revert to block 622 in which another of the categories is selected. If all of the categories have been analyzed (block 632: Y in FIG. 6), the method 600 may continue to block 634.

At block 634, the category compare file 630 that is most similar to the target file 110 of all of the categories may be returned. For example, the analysis of block 631 may indicate which element of the category file sub-matrices 695 has the maximum overlap with the target file vector 190. This element may indicate the category compare file 630 that is most similar to the target file 110. The category compare file 630 associated with this most-similar element of the category file sub-matrices 695 may be returned as part of the operations of block 634.

Though FIGS. 6A and 6B illustrate a grouping of sub-matrices based on category, the embodiments of the present disclosure are not limited to such a configuration. In some embodiments, the sub-matrices may be only subsets of the total number of compare files 130. For example, the compare files 130 may be broken into four (or any number) of groups and a sub-matrix may be generated for each of the groups (as with category file sub-matrices 695 of FIG. 6A). If a target file 110 is identified as being similar to one or more of the compare files 130, further comparisons may be made with respect to the sub-matrices of the various subsets. Since each of the sub-matrices may represent a smaller number of compare files 130, the total number of compare files 130 that are to be analyzed for similarity may be narrowed down by testing the target file vector 190 against each of the subset sub-matrices first. This may reduce a number of operations utilized by the similarity detection engine 160.

Figure 7:
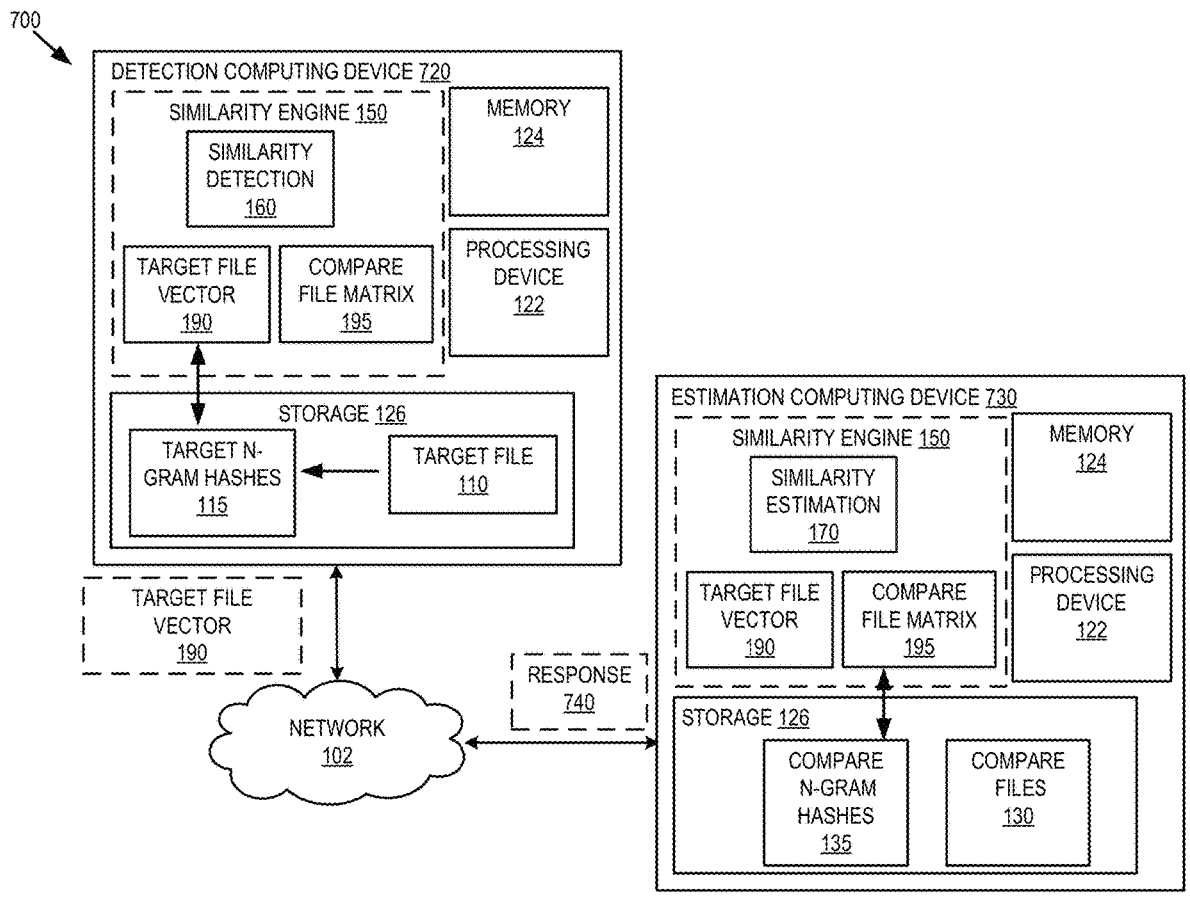
FIG. 7 is a block diagram illustrating a system for determining the similarity of a target file, in accordance with some embodiments of the present disclosure.

The separation of the detection operation and the estimation operation may allow for the similarity detection for a target file 110 to be broken up into multiple operations. FIG. 7 is a block diagram illustrating a system 700 for determining the similarity of a target file 110, in accordance with some embodiments of the present disclosure. A description of elements of FIG. 7 that have been described previously will be omitted for brevity.

In the system 700 of FIG. 7, the similarity operations may be separated into a detection operation performed by a similarity detection engine 160 of a detection computing device 720 and an estimation operation performed by a similarity estimation engine 170 of an estimation computing device 730. Both the detection computing device 720 and the estimation computing device 730 may be configured similarly to the computing device 120 described herein with respect to FIG. 1. For example, both the detection computing device 720 and the estimation computing device 730 may include a memory 124, processing device 122, and/or storage device 126, as described herein with respect to FIG. 1.

A similarity engine 150 of the detection computing device 720 may be configured to receive a target file 110. A similarity detection engine 160 of the similarity engine 150 may be configured to generate target n-gram hashes 115 and a target file vector 190 from the target file 110, as described herein (e.g., with respect to FIG. 3). The similarity detection engine 160 may be configured to compare the target file vector 190 to a compare file matrix 195 to determine whether the target file 110 represented by the target file vector 190 is similar to any of the compare files 130 represented by the compare file matrix 195, as described herein.

In some embodiments, if the target file 110 is determined to be similar to any of the compare files represented by the target file vector 190, the detection computing device 720 may be configured to remediate the target file 110. For example, the detection computing device 720 may be configured to quarantine and/or otherwise restrict access to the target file 110. In addition, the detection computing device 720 may be configured to transmit the target file vector 190 to the estimation computing device 730 over a network 102.

Network 102 may be a public network (e.g., the internet), a private network (e.g., a local area network (LAN) or wide area network (WAN)), or a combination thereof. In one embodiment, network 102 may include a wired or a wireless infrastructure, which may be provided by one or more wireless communications systems, such as a WIFI™ hotspot connected with the network 102 and/or a wireless carrier system that can be implemented using various data processing equipment, communication towers (e.g., cell towers), etc. The network 102 may carry communications (e.g., data, message, packets, frames, etc.) between the detection computing device 720 and/or the estimation computing device 730.

The estimation computing device 730 may be configured to receive the target file vector 190 and compare the target file vector 190 to the respective rows of the compare file matrix 195. For example, a similarity engine 150 of the estimation computing device 730 may be configured to execute a similarity estimation engine 170 to perform estimation operations as described herein with respect to FIG. 4. The compare file matrix 195 may be generated based on compare n-gram hashes 135 generated from a set of compare files 130, as described herein. The similarity estimation engine 170 may be configured to determine a file of the compare files 130 represented by the compare file matrix 195 that is the most similar to the target file 110 represented by the target file vector 190. In some embodiments, the estimation computing device 730 may be configured to provide a response 740 to the detection computing device 720. In some embodiments, the response 740 may indicate which of the compare files 130 is the most similar to the target file 110.

The separation of the similarity detection engine 160 and the similarity estimation engine 170 may allow for the more complex operations of the similarity estimation engine 170 to be focused on the estimation computing device 730, which may be configured with additional resources (e.g., memory 124 and/or processing device 122) to execute the similarity estimation engine 170 more quickly. In some conventional techniques which compare a target file 110 to each of the compare files 130, the use of a remote estimation operation may be difficult because of the latency involved in the operation. Embodiments of the present disclosure, however, may be able to perform a preliminary remediation based on detection operation performed by the similarity detection engine 160. As a result, though there may be latency associated with estimation operation of the estimation computing device 730, the latency may be less impactful since the target file 110 has already been protected/isolated, and the estimation operation is performed only when a similarity has already been detected. As a result, the embodiments of the present disclosure allow for the estimation operation to be improved over conventional techniques.

Figure 8:
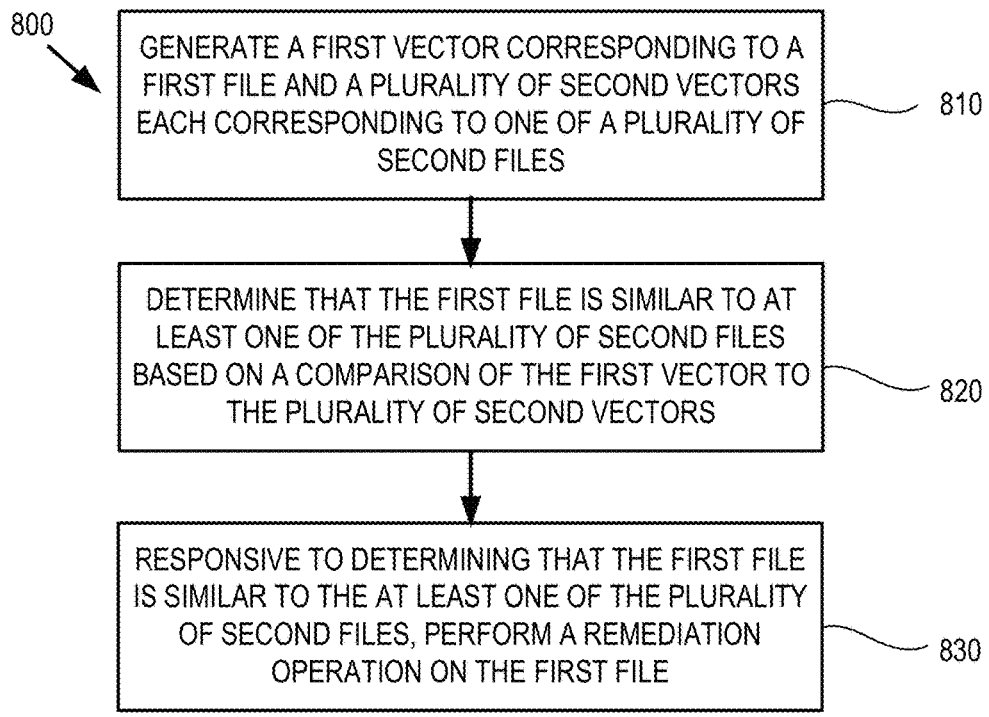
FIG. 8 is a flow diagram of a method of detecting similarity between a first file and a plurality of second files, in accordance with some embodiments of the present disclosure.

FIG. 8 is a flow diagram of a method 800 of detecting similarity between a first file and a plurality of second files, in accordance with some embodiments of the present disclosure. A description of elements of FIG. 8 that have been described previously will be omitted for brevity.

Method 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 800 may be performed by a computing device (e.g., computing device 120).

With reference to FIG. 8, method 800 illustrates example functions used by various embodiments. Although specific function blocks ("blocks") are disclosed in method 800, such blocks are examples. That is, embodiments are well suited to performing various other blocks or variations of the blocks recited in method 800. It is appreciated that the blocks in method 800 may be performed in an order different than presented, and that not all of the blocks in method 800 may be performed.

Referring simultaneously to the prior figures as well, the method 800 begins at block 810, a first vector corresponding to a first file and a plurality of second vectors each corresponding to one of a plurality of second files are generated.

In some embodiments, the first file and the first vector correspond to the target file 110 and the target file vector 190, respectively, described herein with respect to FIGS. 1 to 7. In some embodiments, the plurality of second files correspond to the compare files 130, described herein with respect to FIGS. 1 to 7. In some embodiments, the plurality of second vectors correspond to the compare file vectors 192 and/or the compare file matrix 195, respectively, described herein with respect to FIGS. 1 to 7.

In some embodiments, generating the first vector includes performing a hash operation on each of a plurality of portions of the first file to generate a plurality of hashes and generating the first vector based on the plurality of hashes. In some embodiments, the plurality of hashes may correspond to the target n-gram hashes 115, described herein with respect to FIGS. 1 to 7. In some embodiments, each coordinate of the first vector corresponds to one of each possible value of the hash operation. In some embodiments, at least one portion of the plurality of portions of the first file is determined based on an anchor point within the first file that is identified by advancing a sliding window across a binary sequence of the first file until a hash value of contents enclosed by the sliding window is equal to a threshold value.

At block 820, it is determined that the first file is similar to at least one of the plurality of second files based on a comparison of the first vector to the plurality of second vectors. In some embodiments, the comparison may be performed similar to the operations described herein with respect to FIGS. 1, 2A, 2B, and 3A.

In some embodiments, determining that the first file is similar to the at least one of the plurality of second files based on the comparison of the first vector to the plurality of second vectors includes forming a matrix of the plurality of second vectors and performing an inner product operation on a row sum vector of the matrix and the first vector. In some embodiments, the matrix may be similar to the compare file matrix 195 described herein with respect to FIGS. 1 to 7. In some embodiments, the row sum vector of the matrix may be similar to the compare file row sum vector 395 described herein with respect to FIG. 3.

At block 830, responsive to determining that the first file is similar to the at least one of the plurality of second files, a remediation operation is performed on the first file. In some embodiments, the remediation operation may be similar to block 520 of FIG. 5 and/or blocks 620, 828 of FIG. 6. In some embodiments, the remediation operation may be one or more of quarantining the first file, encrypting the first file, applying increased permissions for access to the first file, and/or deleting the first file.

In some embodiments, the method 800 further includes, responsive to determining that the first file is similar to the at least one of the plurality of second files, determining which of the plurality of second files is most similar to the first file based on a comparison of the first vector to each of the plurality of second vectors. In some embodiments, the comparison to each of the plurality of second vectors may be performed similar to the operations described herein with respect to FIGS. 1, 2A, 2B, and 3B.

In some embodiments, the method 800 further includes generating a plurality of third vectors each corresponding to one of a plurality of third files, wherein each of the plurality of third files belongs to a same file category, forming a matrix of the plurality of third vectors, and determining that the first file belongs to the file category based on an inner product operation on a row sum vector of the matrix and the first vector. In some embodiments, the plurality of third files and the matrix correspond to the category compare files 630 and the category file sub-matrices 695, respectively, described herein with respect to FIGS. 6A and 6B.

Figure 9:
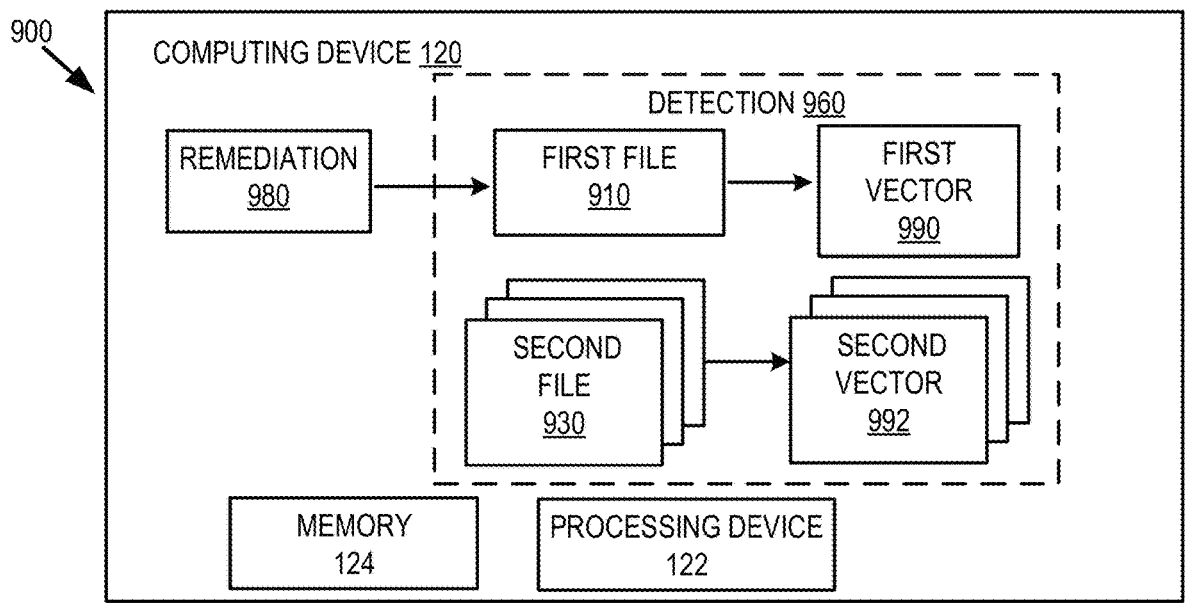
FIG. 9 is a component diagram of an example of a device architecture, in accordance with embodiments of the disclosure.

FIG. 9 is a component diagram of an example of a device architecture 900, in accordance with embodiments of the disclosure. The device architecture 900 includes computing device 120 having processing device 122 and memory 124, as described herein with respect to FIGS. 1 to 8.

A detection engine 960 may generate a first vector 990 corresponding to a first file 910 and a plurality of second vectors 992 each corresponding to one of a plurality of second files 930. In some embodiments, the first file 910 and the first vector 990 correspond to the target file 110 and the target file vector 190, respectively, described herein with respect to FIGS. 1 to 8. In some embodiments, the plurality of second files 930 correspond to the compare files 130, described herein with respect to FIGS. 1 to 8. In some embodiments, the plurality of second vectors 992 correspond to the compare file vectors 192 and/or the compare file matrix 195, respectively, described herein with respect to FIGS. 1 to 8.

The detection engine 960 may further determine that the first file 910 is similar to at least one of the plurality of second files 930 based on a comparison of the first vector 990 to the plurality of second vectors 992. In some embodiments, the comparison may be performed similar to the operations described herein with respect to FIGS. 1, 2A, 2B, and 3A.

Responsive to determining that the first file 910 is similar to the at least one of the plurality of second files 930, a remediation engine 990 may perform a remediation operation on the first file 910. In some embodiments, the remediation operation may be similar to block 520 of FIG. 5 and/or blocks 620, 828 of FIG. 6. In some embodiments, the remediation operation may be one or more of quarantining the first file 910, encrypting the first file 910, applying increased permissions for access to the first file 910, and/or deleting the first file 910.

The device architecture 900 of FIG. 9 provides an improved capability for identifying whether a given file, such as the first file 910, is similar to a set of second files 930. The device architecture 900 allows for a quick determination of whether the first file 910 is similar to any of the second files 930, even if the number of second files 930 continues to increase. Embodiments of the present disclosure may allow for a more complex process for identifying the most similar file of the second files 930 to be avoided if the first file 910 is initially determined not to be similar to any of the second files 930.

Figure 10:
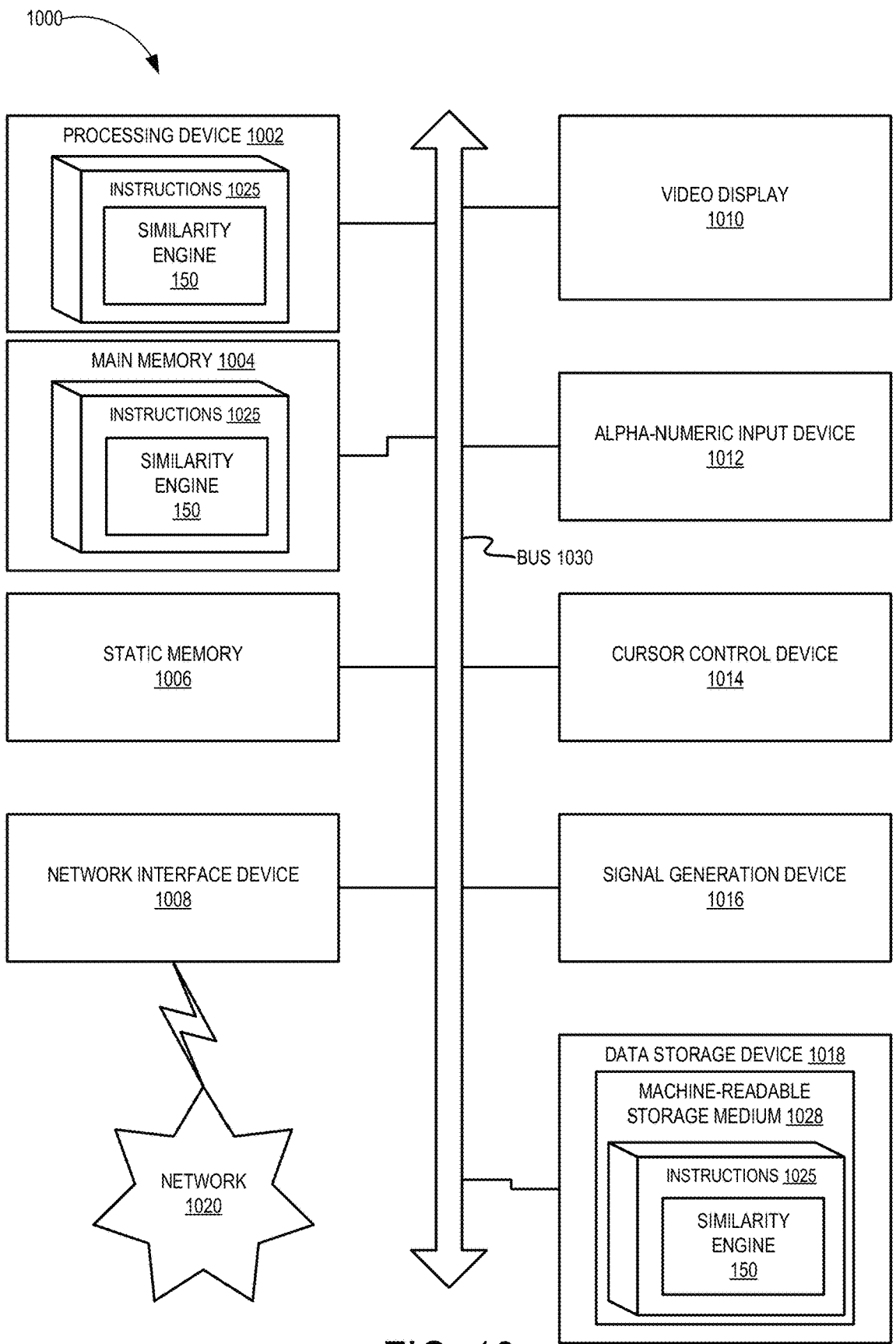
FIG. 10 is a block diagram of an example computing device that may perform one or more of the operations described herein, in accordance with embodiments of the disclosure.

FIG. 10 is a block diagram of an example computing device 1000 that may perform one or more of the operations described herein, in accordance with some embodiments of the disclosure. Computing device 1000 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1000 may include a processing device (e.g., a general purpose processor, a PLD, etc.) 1002, a main memory 1004 (e.g., synchronous dynamic random access memory (DRAM), read-only memory (ROM)), a static memory 1006 (e.g., flash memory and a data storage device 1018), which may communicate with each other via a bus 1030.

Processing device 1002 may be provided by one or more general-purpose processing devices such as a microprocessor, central processing unit, or the like. In an illustrative example, processing device 1002 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1002 may also include one or more special-purpose processing devices such as an application specific integrated circuit (ASIC), a field programmable gate array (FPGA), a digital signal processor (DSP), network processor, or the like. The processing device 1002 may execute the operations described herein, in accordance with one or more aspects of the present disclosure, for performing the operations and steps discussed herein.

Computing device 1000 may further include a network interface device 1008 which may communicate with a network 1020. The computing device 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, video display unit 1010, alphanumeric input device 1012, and cursor control device 1014 may be combined into a single component or device (e.g., an LCD touch screen).

Data storage device 1018 may include a computer-readable storage medium 1028 on which may be stored one or more sets of instructions 1025 that may include instructions for similarity engine 150 for carrying out the operations described herein, in accordance with one or more aspects of the present disclosure. Instructions 1025 may also reside, completely or at least partially, within main memory 1004 and/or within processing device 1002 during execution thereof by computing device 1000, main memory 1004 and processing device 1002 also constituting computer-readable media. The instructions 1025 may further be transmitted or received over a network 1020 via network interface device 1008.

While computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding, or carrying a set of instructions for execution by the machine and that cause the machine to perform the methods described herein. The term "computer-readable storage medium" shall accordingly be taken to include, but not be limited to, solid-state memories, optical media, and magnetic media.

Unless specifically stated otherwise, terms such as "generating," "determining," "performing," "forming," "advancing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting. As used herein, the term "and/or" includes any and all combinations of one or more of the associated listed items.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times, or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   generating a first vector corresponding to a first file and a plurality of second vectors each corresponding to one of a plurality of second files that are malware files;
   determining, by a processing device, that the first file is similar to at least one of the plurality of second files based on a comparison of the first vector to a row sum vector formed from the plurality of second vectors, the determining comprising:
   combining the plurality of second vectors into a matrix;
   forming the row sum vector, wherein the row sum vector comprises a sum of each row of the matrix;
   performing an inner product operation on the row sum vector of the matrix and the first vector; and
   determining that a result of the inner product operation is non-zero;
   performing a first remediation operation on the first file based on the determining that the first file is similar to the at least one of the plurality of second files, wherein the determining indicates that the first file is a malware file, and wherein the first remediation operation comprises quarantining the first file to prevent access to, or execution of, the first file; and
   performing a second remediation operation on the first file in response to the performing of the first remediation operation, wherein the second remediation comprises at least one of adding a restriction to the first file, adding sensitive handling of the first file, encrypting the first file, adding a special flag to the first file, deleting the first file, or invoking a propagation alert on the first file.

2. The method of claim 1, further comprising:
responsive to the determining that the first file is similar to the at least one of the plurality of second files, determining which of the plurality of second files is most similar to the first file based on a comparison of the first vector to each of the plurality of second vectors.

3. The method of claim 1, further comprising:
generating a plurality of third vectors each corresponding to one of a plurality of third files, wherein each of the plurality of third files belongs to a same file category;
forming a matrix of the plurality of third vectors; and
determining that the first file belongs to the same file category based on an inner product operation on a row sum vector of the matrix and the first vector.

4. The method of claim 1, wherein the generating the first vector comprises:
performing a hash operation on each of a plurality of portions of the first file to generate a plurality of hashes; and
generating the first vector based on the plurality of hashes.

5. The method of claim 4, wherein each coordinate of the first vector corresponds to one of each possible value of the hash operation.

6. The method of claim 4, wherein at least one portion of the plurality of portions of the first file is determined based on an anchor point within the first file that is identified by advancing a sliding window across a binary sequence of the first file until a hash value of contents enclosed by the sliding window is equal to a threshold value.

7. A system comprising:
a memory; and
a processing device, operatively coupled to the memory, to:
generate a first vector corresponding to a first file and a plurality of second vectors each corresponding to one of a plurality of second files that are malware files;
determine that the first file is similar to at least one of the plurality of second files based on a comparison of the first vector to a row sum vector formed from the plurality of second vectors, further comprising:
combine the plurality of second vectors into a matrix;
form the row sum vector, wherein the row sum vector comprises a sum of each row of the matrix;
perform an inner product operation on the row sum vector of the matrix and the first vector; and
determine that a result of the inner product operation is non-zero;
perform a first remediation operation on the first file based on the determining that the first file is similar to the at least one of the plurality of second files, wherein the determining indicates that the first file is a malware file, and wherein the first remediation operation comprises quarantining the first file to prevent access to, or execution of, the first file; and
perform a second remediation operation on the first file in response to the performing of the first remediation operation, wherein the second remediation comprises at least one of adding a restriction to the first file, adding sensitive handling of the first file, encrypting the first file, adding a special flag to the first file, deleting the first file, or invoking a propagation alert on the first file.

8. The system of claim 7, wherein the processing device is further to:
responsive to the determining that the first file is similar to the at least one of the plurality of second files, determine which of the plurality of second files is most similar to the first file based on a comparison of the first vector to each of the plurality of second vectors.

9. The system of claim 7, wherein the processing device is further to:
generate a plurality of third vectors each corresponding to one of a plurality of third files, wherein each of the plurality of third files belongs to a same file category;
form a matrix of the plurality of third vectors; and
determine that the first file belongs to the same file category based on an inner product operation on a row sum vector of the matrix and the first vector.

10. The system of claim 7, wherein, to perform said generate of the first vector, the processing device is to:
perform a hash operation on each of a plurality of portions of the first file to generate a plurality of hashes; and
generate the first vector based on the plurality of hashes.

11. The system of claim 10, wherein each coordinate of the first vector corresponds to one of each possible value of the hash operation.

12. The system of claim 10, wherein at least one portion of the plurality of portions of the first file is determined based on an anchor point within the first file that is identified by advancing a sliding window across a binary sequence of the first file until a hash value of contents enclosed by the sliding window is equal to a threshold value.

13. A non-transitory computer-readable storage medium including instructions that, when executed by a processing device, cause the processing device to:
generate a first vector corresponding to a first file and a plurality of second vectors each corresponding to one of a plurality of second files that are malware files;
determine, by the processing device, that the first file is similar to at least one of the plurality of second files based on a comparison of the first vector to a row sum vector formed from the plurality of second vectors, further comprising:
combine the plurality of second vectors into a matrix;
form the row sum vector, wherein the row sum vector comprises a sum of each row of the matrix;
perform an inner product operation on the row sum vector of the matrix and the first vector; and
determine that a result of the inner product operation is non-zero;
perform a first remediation operation on the first file based on the determining that the first file is similar to the at least one of the plurality of second files, wherein the determining indicates that the first file is a malware file, and wherein the first remediation operation comprises quarantining the first file to prevent access to, or execution of, the first file; and
perform a second remediation operation on the first file in response to the performing of the first remediation operation, wherein the second remediation comprises at least one of adding a restriction to the first file, adding sensitive handling of the first file, encrypting the first file, adding a special flag to the first file, deleting the first file, or invoking a propagation alert on the first file.

14. The non-transitory computer-readable storage medium of claim 13, wherein the processing device is further to:

responsive to the determining that the first file is similar to the at least one of the plurality of second files, determine which of the plurality of second files is most similar to the first file based on a comparison of the first vector to each of the plurality of second vectors.

15. The non-transitory computer-readable storage medium of claim 13, wherein the processing device is further to:
generate a plurality of third vectors each corresponding to one of a plurality of third files, wherein each of the plurality of third files belongs to a same file category;
form a matrix of the plurality of third vectors; and
determine that the first file belongs to the same file category based on an inner product operation on a row sum vector of the matrix and the first vector.

16. The non-transitory computer-readable storage medium of claim 13, wherein, to perform said generate of the first vector, the processing device is to:
perform a hash operation on each of a plurality of portions of the first file to generate a plurality of hashes; and
generate the first vector based on the plurality of hashes.

17. The non-transitory computer-readable storage medium of claim 16, wherein each coordinate of the first vector corresponds to one of each possible value of the hash operation.

* * * * *